July 22, 1924. Re. 15,878
J. STEFAN, JR
FENCE
Original Filed March 8, 1922
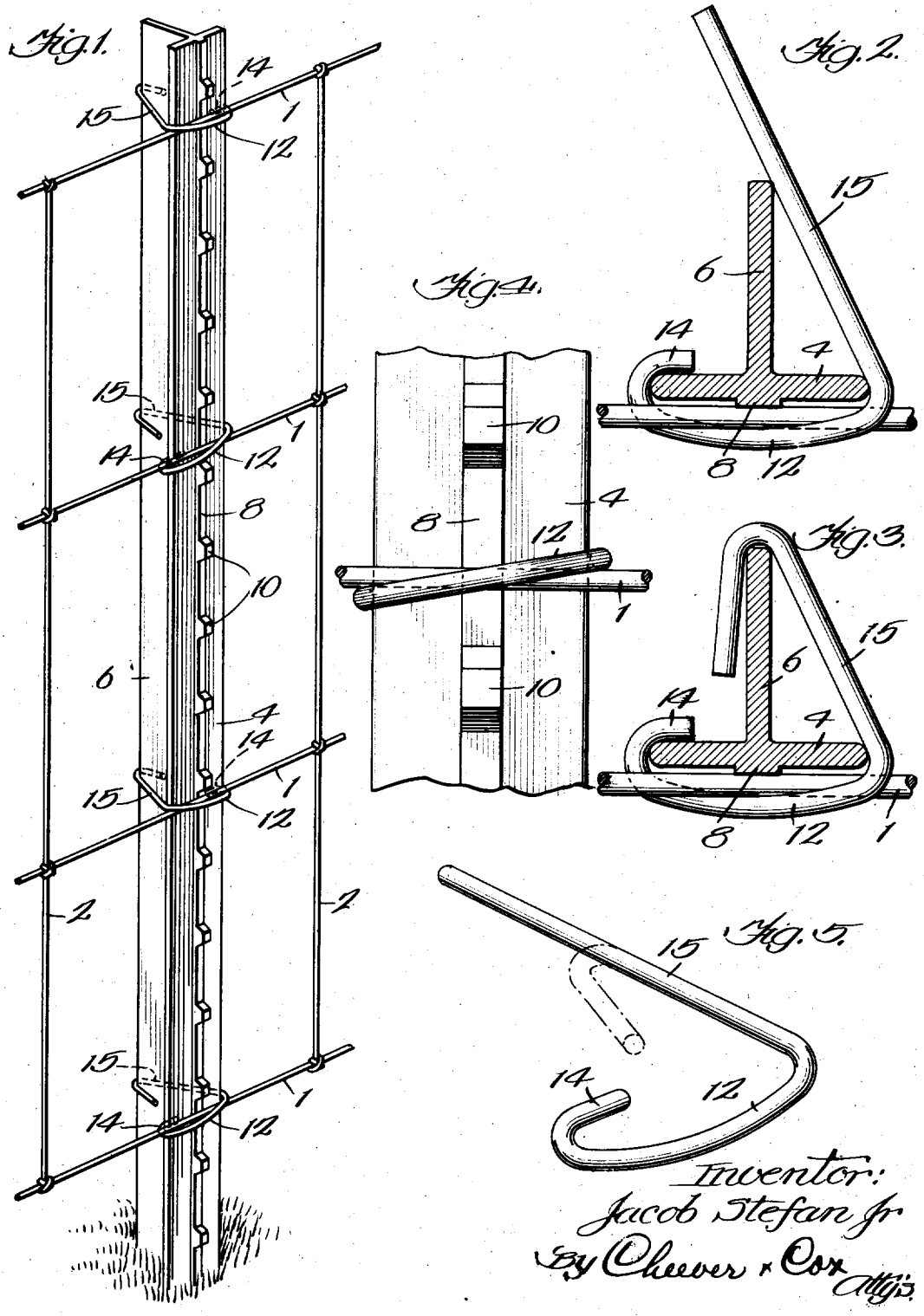

Reissued July 22, 1924. Re. 15,878

UNITED STATES PATENT OFFICE.

JACOB STEFAN, JR., OF CHICAGO HEIGHTS, ILLINOIS, ASSIGNOR, BY MESNE ASSIGNMENTS, TO INLAND STEEL COMPANY, OF CHICAGO, ILLINOIS, A CORPORATION OF DELAWARE.

FENCE.

Original No. 1,452,766, dated April 24, 1923, Serial No. 542,101, filed March 8, 1922. Application for reissue filed June 5, 1924. Serial No. 718,180.

*To all whom it may concern:*

Be it known that I, JACOB STEFAN, Jr., a citizen of the United States, residing at Chicago Heights, in the county of Cook and State of Illinois, have invented a certain new and useful Improvement in Fences, of which the following is a specification.

My invention relates to fencing, particularly wire fencing, and the general object of the invention is to provide fencing in which the horizontal wires of the fencing may, in a simple manner, be securely held to the posts. My invention is particularly applicable to fencing in which the post is of metal and has a rear leg or flange projecting backward at right angles to the plane of the fence. More specifically, my purpose is to provide a clip adapted to engage the fence post in a particular manner to hold the fence wire securely to the post with a minimum of effort on the part of the builder, with a minimum of material, and with a maximum degree of permanence and strength. It is also my purpose to obtain a construction which will embody the foregoing characteristics and at the same time permit the fence wire to shift horizontally relatively to the post.

I accomplish my objects by the construction illustrated in the accompanying drawing in which—

Figure 1 is a perspective view of a section of my fencing at one of the posts.

Figure 2 is a plan section of the post showing also one of the horizontal fence wires and showing the clip in the process of being applied.

Figure 3 is similar to Figure 2 except that the clip is shown in final fastened position.

Figure 4 is a front elevation of the post shown in Figure 3.

Figure 5 is a perspective view of the clip. The full lines show the clip in the condition in which it is furnished by the manufacturer to the user. The dotted lines show the shape of the clip after it has been applied.

Like numerals denote like parts throughout the several views.

In the form illustrated, the fencing has horizontal wires 1 connected by vertical wires 2. The vertical wires may be omitted. According to the illustrated design the fence post is in the form of a T bar, having what will be called a "front" 4 and a rearward extending leg or flange 6. The front consists in reality of two legs or flanges arranged in the same plane at right angles to, and extending in opposite directions from the plane of the leg 6. I have illustrated the post as having a central front ridge 8 and regularly spaced lugs 10, but I do not lay any claim to these characteristics. The same are shown in a co-pending application filed by Harold C. Jones, January 16th, 1922, Serial No. 529,404.

Now referring to the clip, which forms one of the essential elements of the invention: this consists of a piece of stout wire which, as it leaves the manufacturer, is in the form shown in Figures 2 and 5. It has a front section 12 terminating in a hook 14 at one end, and at the other end a long and straight section 15 extending obliquely backward. In the form shown, the front section is in the form of a flat arch and the backward reaching section makes an angle of approximately 60 degrees with it.

In practice, after the fence post has been set upright in the ground the fencing is laid against the front, the horizontal wires 1 lying in contact with the front of the post or with the ridge 8. The clip is then applied to each one of the horizontal wires in the manner shown in Figure 2. The hook 14 is passed over the edge of one of the flanges 4; then the central section 12 is passed obliquely across the front of the post outside of the adjacent wire, and the long section 15 is brought into contact with the edge of the remaining front flange and with the rear edge of the back leg 6. The operator then takes a hammer or other tool and bends the rear end of section 16 around the rear end of leg 6 into the position shown in Figures 1 and 3. The parts thereupon become permanently assembled, the material of the clip being of such character as to efficiently maintain its new configuration.

Wire fence clips are not new per se, being shown, for example, in the said Jones application; but in the Jones type the clips engage only the edges of the front flange whereas in my construction the clip is carried back to engage the rear edge of the rear flange or leg. The effect is noticeably different and better. In the first place a clip of my type is easier to apply, for it is larger and more convenient to handle, and the bend which must be formed in the field is formed at a point which is much more accessible to the builder. Furthermore it is not necessary to bend the wire through as great an angle with my type as it is in the previous type where the angle of bend is approximately 180 degrees. In my clip the bend is appreciably less than this and the result is that the bent portion can lie more snugly against the surface of the flange around which it engages. But a more important consideration still is the fact that the stress resulting in horizontal pressure against the horizontal wire, to force the wire away from the post, is much more nearly in line with the section of the clip which resists it. In other words, the portion of the clip lying between the front flange and the point where it engages the back of the post is more nearly in line with the pull than in the case of a clip where the final bend is bent around the front flange. As a result of many tests it has been found that a much stronger force (tending to pull the fencing away from the post) will be resisted by a clip of my type than by a clip of the type heretofore employed. With my type of clip, also, the horizontal fence wires may shift horizontally for adjustment and yet the clip will exert a limited amount of friction to prevent the wire from shifting too easily. Another advantage of my structure is that the rear flange forms an "anvil", so to speak, about which the final bend (made in the field) can be made. Usually the clip is applied by first adjusting it and then making the final bend by striking the rear end with a hammer and bending it around the rear flange of the post. It will be evident that this rear flange makes a very efficient anvil or former-block upon which the bend can be made. The rear edge is not only readily accessible but also has the advantage of being located on the neutral axis of the section thus giving better balance and resistance to the hammer blow than if it were not thus centrally located.

It is desirable, but not essential, that in applying the clips they be made to alternate in their direction of slant, that is, it is desirable that one clip cross the horizontal wire slanting downward toward the right, and that the next one cross it slanting downward toward the left. It is also desirable, but not essential, that the longer section 15 lie on the right side of the post in some cases and on the left side in other cases, as illustrated in Figure 1.

Having thus described my invention what I claim as new and desire to secure by Letters Patent is:

1. A fastener for the wires of fences in which there is a T bar fence post and a horizontal fence wire passing across its front face, the fastener having a hook at one end for engaging one of the front flanges of the post, a mid portion to extend across the front of the post and engage the wire and a third portion extending rearward in substantially the same plane as the hook and of sufficient length to pass around the rear edge of the rear flange of the post for engaging it.

2. A fastener for fencing in which there is a T bar post and a horizontal fence wire passing across its front face, said fastener being partially preformed, and having a hook at one end for engaging one of the front flanges of the post, a mid portion to extend across the front of the post and in front of the wire for holding the latter to the post, and a third portion extending backwards and making an angle of less than 90 degrees with the mid portion of the fastener, said third portion being of considerably greater length than the mid portion to enable it to extend around the rear flange to form a second hook for holding the fastener to the post.

3. The combination with a metal fence post in the form of a T bar, a wire passing across the front of the post, and a fastener for the wire, said fastener being made of wire and having a hook at one end for engaging one of the front flanges of the post, and a mid portion to extend across the front of the post and in front of the wire, said fastener being slightly oblique to enable it to cross the wire and thereby hold it to the post, and a third section extending rearward to the edge of the rear flange and there having a hook to engage said rear flange for holding the fastener to the post.

4. A clip for fencing in which there is a T bar post and a horizontal fence wire passing across its front face, said clip being of stout, bendable wire having a hook at one end adapted to engage one of the post flanges, a flatly bowed section adapted to extend across the face of the post, and a backward reaching section bent in such direction that the included angle, relatively to the front section, is approximately 60 degrees, the backward reaching section extending to and considerably beyond the rear flange, whereby it may be bent around said rear flange and the resistance for producing the bend be furnished by said flange.

JACOB STEFAN, Jr.